United States Patent
Chau

(10) Patent No.: US 11,943,074 B2
(45) Date of Patent: Mar. 26, 2024

(54) REAL-TIME VIDEO-BASED AUDIENCE REACTION SENTIMENT ANALYSIS

(71) Applicant: Zoom Video Communications, Inc., San Jose, CA (US)

(72) Inventor: Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/514,918

(22) Filed: Oct. 29, 2021

(65) Prior Publication Data

US 2023/0134143 A1 May 4, 2023

(51) Int. Cl.
*H04L 12/18* (2006.01)
*G06V 10/50* (2022.01)
*G06V 40/20* (2022.01)

(52) U.S. Cl.
CPC ........ *H04L 12/1827* (2013.01); *G06V 10/507* (2022.01); *G06V 40/20* (2022.01); *H04L 12/1831* (2013.01)

(58) Field of Classification Search
None
See application file for complete search history.

(56) References Cited

U.S. PATENT DOCUMENTS

| | | | |
|---|---|---|---|
| 9,843,768 B1 | 12/2017 | Negi et al. | |
| 10,410,125 B1* | 9/2019 | Finkelstein | G06F 16/35 |
| 2010/0253689 A1 | 10/2010 | Dinicola et al. | |
| 2011/0246463 A1* | 10/2011 | Carson, Jr. | G06F 16/951 |
| | | | 707/754 |
| 2016/0073054 A1 | 3/2016 | Balasaygun et al. | |
| 2019/0130243 A1* | 5/2019 | Penubothula | G01C 21/3415 |
| 2019/0341050 A1 | 11/2019 | Diamant et al. | |
| 2019/0349212 A1* | 11/2019 | Heins | H04L 12/1831 |
| 2020/0403817 A1 | 12/2020 | Daredia et al. | |
| 2021/0076002 A1 | 3/2021 | Peters et al. | |
| 2021/0157974 A1* | 5/2021 | Xie | H04L 51/063 |
| 2021/0185276 A1* | 6/2021 | Peters | G06V 20/41 |
| 2022/0131717 A1* | 4/2022 | Kwatra | G10L 15/1815 |

OTHER PUBLICATIONS

International Search Report and Written Opinion dated Jan. 19, 2023 in corresponding PCT Application No. PCT/US2022/045143.

* cited by examiner

*Primary Examiner* — Glenton B Burgess
*Assistant Examiner* — Gregory P Tolchinsky
(74) *Attorney, Agent, or Firm* — Young Basile Hanlon & MacFarlane, P.C.

(57) ABSTRACT

Video data from audience participants reacting to a speaker participation during a conference is obtained. The video data is processed to detect and recognize reactions based on a speaker presentation. Sentiment types are determined for the recognized reactions in view of a context of the speaker presentation. An engagement level is determined based on aggregated sentiment types for the audience participants. A real-time recommendation output is presented based on the engagement level. The real-time recommendation output provides suggestive actions for the speaker participant based on a positive or negative engagement level.

19 Claims, 10 Drawing Sheets

US 11,943,074 B2

REAL-TIME VIDEO-BASED AUDIENCE REACTION SENTIMENT ANALYSIS

FIELD

This disclosure relates to communication services. More specifically, this disclosure relates to providing a speaker with real-time recommendations based on real-time video-based sentiment analysis of audience reaction content.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
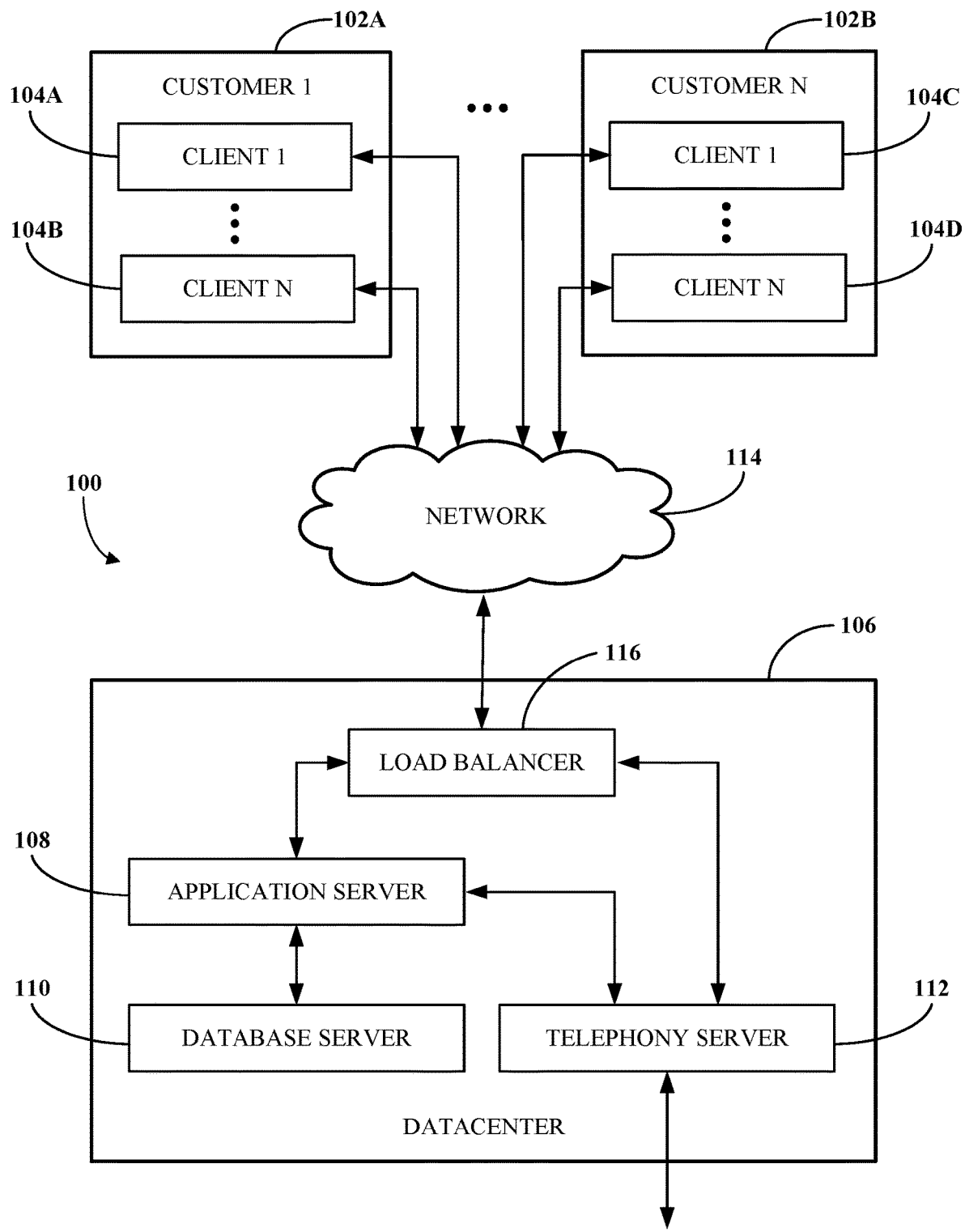
FIG. 1 is a block diagram of an example of an electronic computing and communications system.

During a real-time communication, such as over a video conference between two or more people, one of the participants may at some point be considered a speaker based on him or her giving a presentation (e.g., leading a discussion, lecturing, or monologuing). The other participants may be considered audience participants. The ability of the speaker to maintain audience engagement is important, as a disengaged audience is less likely to pay attention to the speaker or otherwise care about what the speaker is saying. The speaker, however, is focused on his or her conversation points or presentation, and may in some cases not be able to discern the audience reaction to the presentation and a level of engagement therewith. For example, during a video conference, some audience participants may not be visible to the speaker in a gallery view, such as based on a maximum number of user tiles representing the participants that may be presented in a graphical user interface of the video conferencing software at a given time. The speaker is thus unable to perceive reactions from participants whose user tiles are not visible to him or her without cumbersomely scrolling through multiple user interfaces. Even where all participants are visible to the speaker, attempting to gauge audience interest may detract from the presentation such as by distracting the speaker, which may lead to greater levels of audience disengagement.

Disengagement can occur for a number of reasons. For example, the presentation ability, style, or behavior (referred to herein as presentation behavior) of the speaker may be monotonic, dull, and/or unaspiring. In another example, the specific topic being discussed may not be of interest to one or more audience members. In yet another example, the audience may be confused by something the speaker said or the way in which the speaker said it, which in turn can lead to audience disengagement. The disengagement can occur during one or more portions of the real-time communication. A speaker may benefit greatly from understanding when audience disengagement occurs, especially where it is difficult or impossible for the speaker to perceive the disengagement on his or her own (e.g., where user tiles for some video conference participants are not visible without scrolling through multiple user interfaces), so that the speaker can adjust some aspect of his or her presentation. However, while solutions exist for evaluating audience sentiment based on audible reactions from the audience, conventional conferencing software services do not have mechanisms for evaluating audience sentiment based on video data obtained from devices used by the audience to connect to a video conference. Conventional approaches therefore do not contemplate the video modality, which is often more complicated than audio alone for evaluating audience sentiment given the variance in visible behaviors and gestures across people. As such, there is currently no solution for producing real-time recommendations for a speaker to alter his or her presentation behavior, pause for a question, change topics, or maintain a topic discussion based on an audience engagement level determined over video.

Implementations of this disclosure address problems such as these using audience engagement services which provide real-time evaluation of audience sentiment using video data obtained from devices used by the audience to connect to a video conference. During a video conference, for example, sentiment types of audience participants reacting to a speaker participant are determined based on reaction detection from the video data of the audience participants. The reactions of the audience participants can be determined using facial recognition and movement detection on the video data, audio analysis from an audio stream, and keyword detection from a real-time transcription of the conference. This can include, for example, analysis of audience participants not visible without scrolling through multiple user interfaces. An engagement level of the audience participants are determined from the sentiment types. For example, the sentiment types can be aggregated to determine a consensus engagement level of the audience participants. A recommendation, a real-time recommendation, or real-time suggestive output (referred to herein as a real-time recommendation) is presented to the speaker participant based on the engagement level. For example, a real-time recommendation is one that is near in time to a reaction detection. The real-time recommendation output can include an engagement level indicator, a suggestive action, and/or combinations thereof. For example, the engagement level indicator can use or show a color-based format for different engagement levels, a numeric format, and/or a text-based format. The suggestive action, for example, can be to maintain a topic, maintain a speaker presentation behavior, change to a suggested topic, and/or change the speaker presentation behavior. The suggestive action is based on an analysis of the video data and the conference with respect to the speaker participant.

To describe some implementations in greater detail, reference is first made to examples of hardware and software structures used to implement a system for real-time video-based audience reaction sentiment analysis. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a unified communications as a service (UCaaS) platform or other software platform. Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a UCaaS platform, which includes several communications services integrated over a network, such as the Internet, to deliver a complete communication experience regardless of physical location.

Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
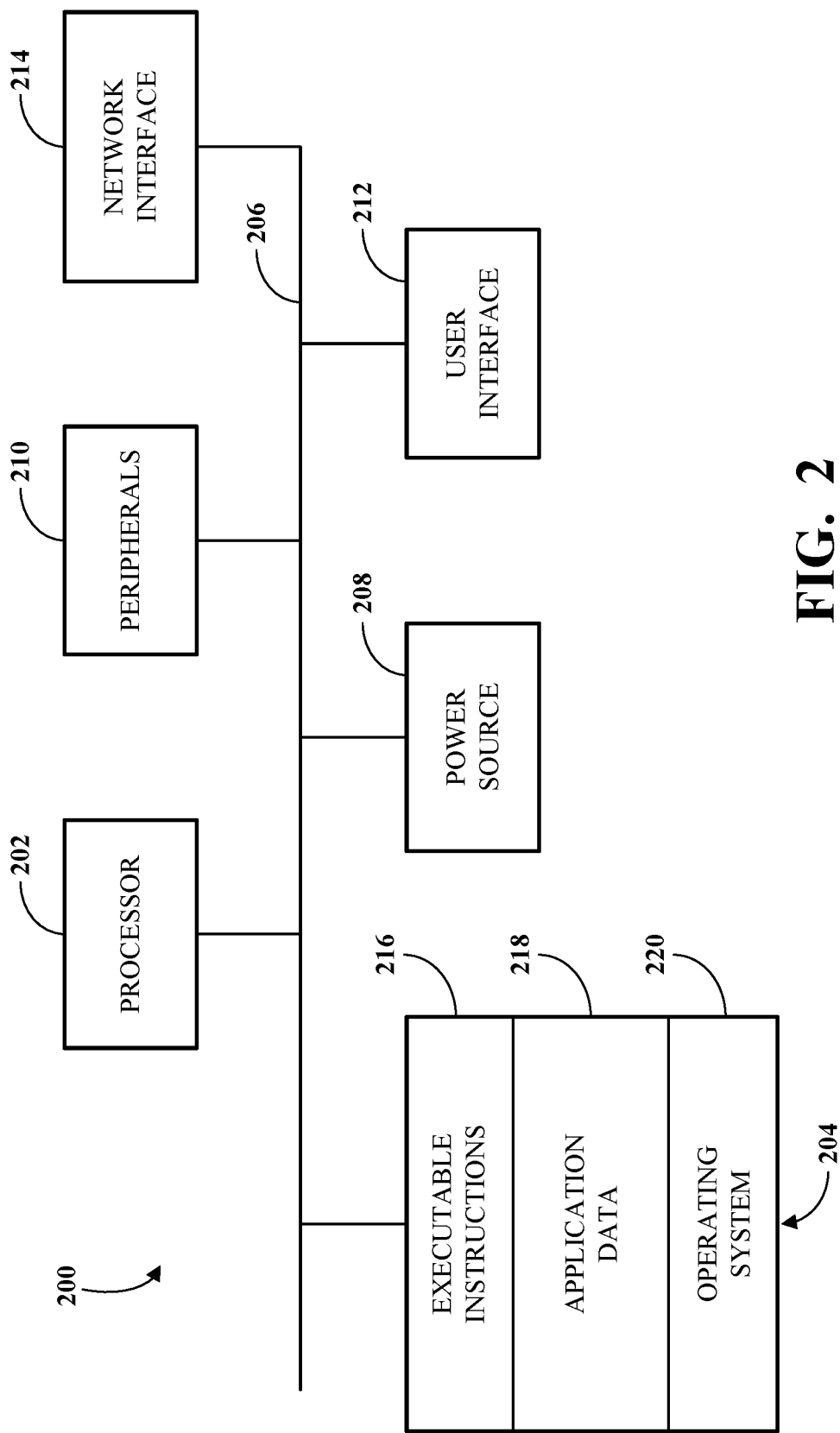
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
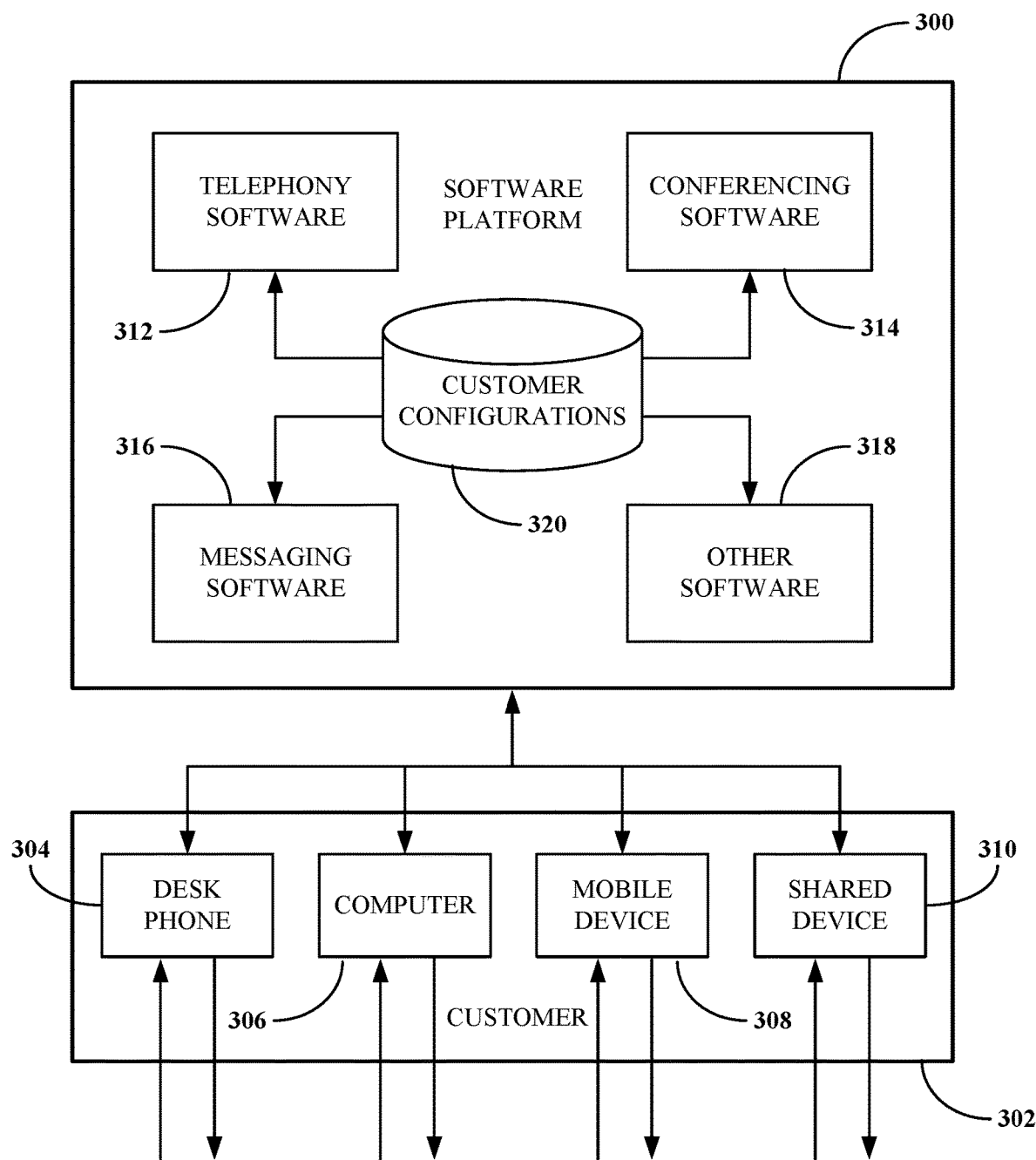
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format. The other software 318 enables other functionality of the software platform 300. Examples of the other software 318 include, but are not limited to, device management software, resource provisioning and deployment software, administrative software, third party integration software, and the like. In one particular example, the other software 318 can include audience engagement software for determining, during a video conference, sentiment types of audience participants reacting to a speaker participant based on reaction detection from video data of the audience participants, determining an engagement level based on the sentiment types, and presenting a real-time recommendation output to the speaker participant based on the engagement level.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
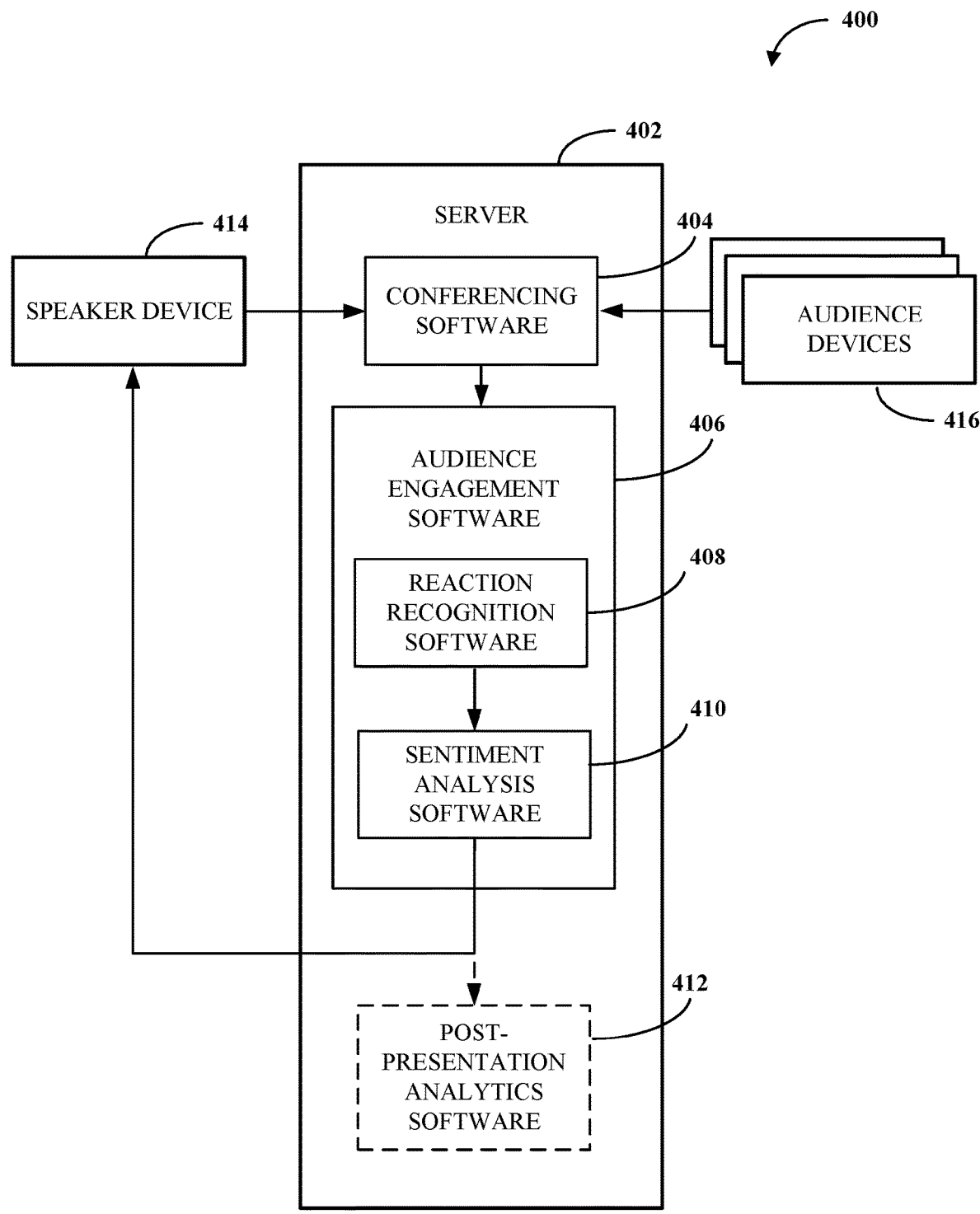
FIG. 4 is a block diagram of an example of a system for real-time video-based audience reaction sentiment analysis.

FIG. 4 is a block diagram of an example of a system 400 for real-time video-based audience reaction sentiment analysis. The system 400 includes a server 402 which runs conferencing software 404 and audience engagement software 406. The conferencing software 404 implements a conference between operators of multiple devices and may, for example, be the conferencing software 314 shown in FIG. 3. As shown, the conferencing software 404 implements a conference between an operator of a speaker device 414 and operators of one or more audience devices 416. Each of the speaker device 414 and the audience devices 416 may be a client device such as one of the clients 304 through 310 shown in FIG. 3 or a non-client device which accesses the conferencing software 404 other than by using a client application.

The audience engagement software 406 interfaces with the conferencing software 404 to provide real-time recommendations to an operator of the speaker device 414 (e.g., a speaker) based on sentiment analysis of reactions of operators of the one or more audience devices 416 (e.g., audience participants) during a conference implemented by the conferencing software 404. The audience engagement software 406 can include reaction recognition software 408 and sentiment analysis software 410.

The reaction recognition software 408 determines a reaction of an audience participant in response to speaker actions or presentations. In an example, the reaction recognition software 408 monitors video of the audience participants during the conference implemented by the conferencing software 404 to determine video data-based reactions of audience participants in response to speaker participant actions or presentations. The video can be from, for example, tiles or similar video windows, which show videos of the audience participants in the conference. For example, the reaction recognition software 408 can use facial recognition and movement detection to determine facial expressions, gestures, head positions, and movement with respect to an audience device of the audience participant. In another example, the reaction recognition software 408 may supplement and/or confirm the video-based determinations by using a real-time transcription of the conference, to detect audible or verbal reactions of audience participants in response to speaker actions or presentations. For example, a contextual machine learning model can use words spoken by the audience participant temporally at or near the video-based determinations to identify words indicative of understanding, questioning, or other expressive terms. The reaction determination can be for audience participants that are perceptible and imperceptible to the speaker participant during the conference. For example, depending on a view used during the conference implemented by the conferencing software 404 and/or a number of audience members participating in the conference, user tiles for some of the audience participants may not be visible to the speaker participant. In an implementation, audience participants may be on mute for the conference but can provide audio feedback that isn't heard by other audience participants, which can be used for the audience engagement or sentiment analysis.

The sentiment analysis software 410 determines a context of the speaker presentation or conference by evaluating content of a real-time transcription using a contextual machine learning model. The context can refer to a purpose of the conference or a setting or environment in or for which the speaker presentation is being made. For example, the contextual machine learning model can identify, based on the words, whether the speaker presentation is for a classroom, training, education, or a customer service call. The context is used by the sentiment analysis software 410 to determine a sentiment type of the determined reaction. The determined reaction can have multiple meanings depending on the context. For example, an audience participant nodding his or her head may have multiple meanings depending on the context of the speaker presentation. For example, if the context is a sales presentation, then the nodding can indicate a positive reaction. In another example, if the context is a customer service conversation, then the nodding can indicate a negative reaction. The sentiment types can include, but is not limited to, a positive reaction, negative reaction, questioning reaction, surprised reaction, neutral, or blank face reaction. The sentiment analysis software 410 aggregates the sentiment types to determine an engagement level or type. For example, engagement levels can include, but is not limited to, highly engaged, somewhat engaged, somewhat disengaged, not engaged, positive, or negative. A real-time recommendation is presented to the speaker participant based on the engagement level. For example, the real-time recommendation output can be to maintain the current topic. In another example, the real-time recommendation output can be to change the current topic. The real-time recommendation output can include a different topic identified by evaluating content of a real-time transcription of the conference using a contextual machine learning model.

In an example, the audience engagement software 406 can determine, at or near a time of the reaction detection, a performance behavior of the speaker participant based on analyzing video data obtained from a device of the speaker and/or some or all of a real-time transcription of a presentation of the speaker using one or more contextual machine learning models. For example, the performance behavior can include, but are not limited to, monotonic speaking patterns, waving arms, no eye contact, and talking too fast. For example, the real-time recommendation output can be to maintain a current speaker participant behavior when the engagement level is positive. In another example, the real-time recommendation output can be to change a current speaker participant behavior when the engagement level is negative. In yet another example, the real-time recommendation output can be to maintain the current topic and presentation behavior. In a further example, the real-time recommendation output can be to change the current topic and the presentation behavior.

In some implementations, the audience engagement software 406 can receive electronic reactions (e.g., the "thumbs up," "hands clapping," and other emojis available during a video conference) from the audience participants. The audience engagement software 406 can aggregate the electronic reactions to determine an engagement level or type. For example, engagement levels can include, but is not limited to, highly engaged, somewhat engaged, somewhat disengaged, not engaged, positive, or negative. A real-time recommendation is presented to the speaker participant based on the engagement level. For example, the real-time recommendation output can be to maintain the current topic. In another example, the real-time recommendation output can be to change the current topic. The real-time recommendation output can include a different topic identified by evaluating content of a real-time transcription of the conference using a contextual machine learning model. In an example, the aggregate electronic reactions can be used to validate the video-based audience reactions and other audience reactions as described herein.

In some implementations, the audience engagement software 406 can include post-presentation analytics software 412. The post-presentation analytics software 412 can aggregate conference sessions including, but not limited to, reaction detections, sentiment types, engagement levels, real-time recommendation outputs, and associated timestamps. The aggregated conference sessions can indicate which real-time recommendation outputs were effective, what topics were interesting based on the engagement levels, what presentation behaviors were effective, trends, and the impact of real-time recommendation outputs. In an example, the post-presentation analytics software 412 can analyze historical conference sessions using the audience engagement software 406 as described herein. The audience engagement software 406 can provide recommendation outputs for reaction detections in the historical conference sessions. These recommendation outputs can be used for training and education purposes. In yet another example, the recommendation outputs can be used to train a machine learning model specific to a speaker participant. The trained machine learning model can then be used to provide real-time recommendations to the speaker participant when presenting during conferences, webinars, and other conferencing arrangements. In still another example, the post-presentation analytics software 412 can analyze the reaction detections, the sentiment types, the engagement levels, and the real-time recommendation outputs to determine effectiveness of speakers with respect to one or more presentations. This can identify strengths and weaknesses of the speakers with respect to the presentations. This, in turn, can be used for training or education purposes. For example, the output from the post-presentation analytics software 412 can be used for cross-speaker analysis, training videos and in focus groups.

In some implementations, the audience engagement software 406 can include post-presentation analytics software 412. The post-presentation analytics software 412 can aggregate conference sessions including, but not limited to, reaction detections, sentiment types, engagement levels, real-time recommendation outputs, and associated timestamps. The conference sessions can be of the speaker and other speakers. The aggregated conference sessions can indicate which real-time recommendation outputs were effective, what topics were interesting based on the engagement levels, what presentation behaviors were effective, trends, the impact of real-time recommendation outputs, and audience reaction to different speaker actions or behaviors. This can identify patterns with respect to audience reactions and different speaker actions or behaviors. This, in turn, can be used for training or education purposes. For example, the output from the post-presentation analytics software 412 can be used for cross-speaker analysis, training videos and in focus groups.

In some implementations, the system 400 may be used when the speaker participant is presenting in a live audience scenario such as in a lecture hall or at a stadium. In this example, the audience devices 416 can be cameras and other audio-visual devices which can capture and feed video data to the conferencing software 404 for real-time video-based audience reaction sentiment analysis by the audience engagement software 406. The real-time recommendation outputs can be presented at the speaker device 414 or at secondary devices as described with respect to FIG. 9.

In some implementations, the system 400 may be used when the conferencing software 404 is used for running a webinar, which typically have large audiences and the focus is on the speaker participant or panelists. The webinars include the ability to provide polling, answer questions live or via text, and bring a view-only attendee live on video to ask a question or contribute. In this example, the audience devices 416 can represent one or more webinar participants, which feed video data to the conferencing software 404 for real-time video-based audience reaction sentiment analysis by the audience engagement software 406. The real-time recommendation outputs can be presented at the speaker device 414 or at secondary devices as described with respect to FIG. 9.

In some implementations, the post-presentation analytics software 412 can be used for training, preparing, or assisting contact center agents for future customer interactions. The post-presentation analytics software 412 can process one or more video data recordings for a contact center agent using the real-time video-based audience reaction sentiment analysis provided by the audience engagement software 406. The audience engagement software 406 can provide recommendation outputs for reaction detections in the one or more video data recordings. The recommendation outputs can be used to train a machine learning model specific to the contact center agent. The trained machine learning model can then be used to provide real-time recommendations to the contact center agent during future customer interactions. The machine learning model specific to the contact center agent can be updated by the post-presentation analytics software 412 based on video recordings of further customer interactions. For example, the post-presentation analytics software 412 can aggregate a contact center agent's customer interactions including, but not limited to, reaction detections, sentiment types, engagement levels, real-time recommendation outputs, and associated timestamps. The aggregated customer interactions can indicate which real-time recommendation outputs were effective, what topics were interesting based on the engagement levels, what presentation behaviors were effective, trends, and the impact of real-time recommendation outputs. The machine learning model specific to the contact center agent can be updated accordingly.

In an example, the post-presentation analytics software 412 can analyze historical conference sessions from the speaker and other speakers using the audience engagement software 406 as described herein. The audience engagement software 406 can provide recommendation outputs for reaction detections in the historical conference sessions. These recommendation outputs can be used for training and education purposes. In yet another example, the recommendation outputs can be used to train a machine learning model specific to a speaker participant. The trained machine learning model can then be used to provide real-time recommendations to the speaker participant when presenting during conferences, webinars, and other conferencing arrangements.

The audience engagement software 406, for example, may be the audience engagement software referred to above with respect to the other software 318 shown in FIG. 3. In some implementations, the conferencing software 404 may include the audience engagement software 406. In some implementations, the conferencing software 404 and the audience engagement software 406 may be wholly or partially run on different servers.

Figure 5:
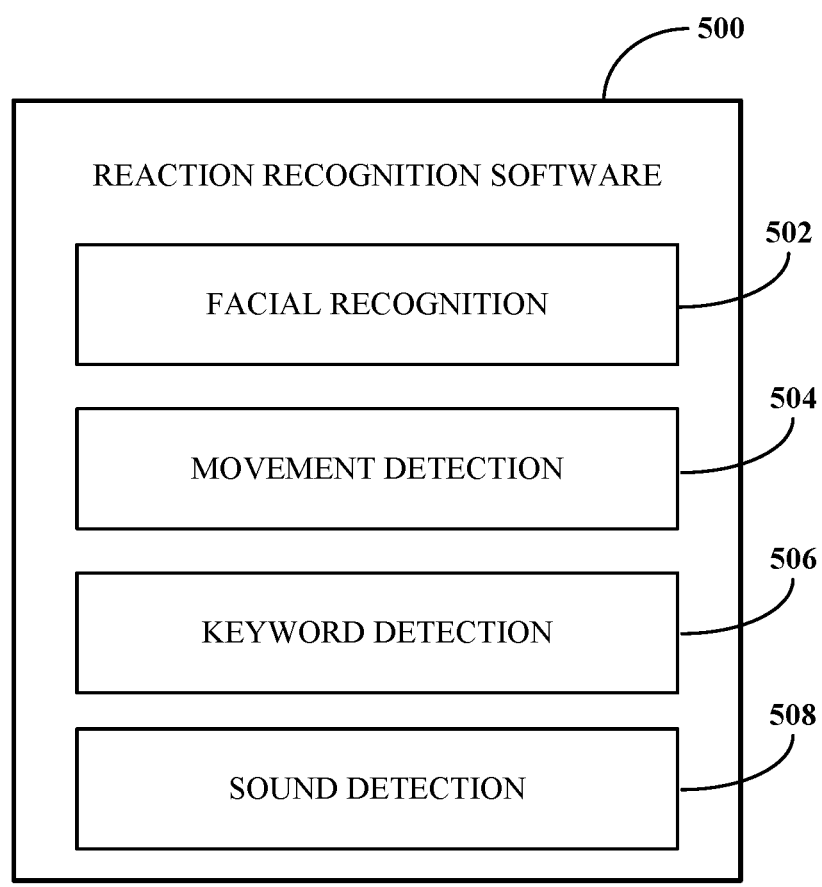
FIG. 5 is a block diagram of example functionality of reaction recognition software.

FIG. 5 is a block diagram of example functionality of reaction recognition software 500, which may, for example, be the reaction recognition software 408 shown in FIG. 4. The reaction recognition software 500 includes tools, such as programs, subprograms, functions, routines, subroutines, operations, and/or the like for detecting and determining reactions of audience participants to a presentation by a speaker participant during a conference. As shown, the reaction recognition software 500 includes a facial recognition tool 502, a movement detection tool 504, a keyword reaction detection tool 506, and a sound reaction detection tool 508.

The facial recognition tool 502 determines from video data of an audience participant a reaction to a temporally associated portion of a presentation by the speaker participant. The facial recognition tool 502 can detect and determine a generic shape of certain facial features including, for example, eyebrows, eyes, and mouth on a face of the audience participant. The facial recognition tool 502 may use the output of a learning model trained for reaction or expression determination processing to identify a reaction. For example, the identified reactions can include, but is not limited to, surprise, blank expression, neutral, happy, smiling, frowning, puzzled, curious, or questioning.

The movement detection tool 504 determines from video data of an audience participant a reaction to a temporally associated portion of a presentation by the speaker participant. The movement detection tool 504 can detect, for example, whether an audience participant is leaving a room or premise during a presentation by the speaker participant or raising a hand. For example, the movement detection tool 504 can detect movement by identifying an object in the video data and tracking the object across multiple frames in the video data. In another example, the movement detection tool 504 can detect, for example, whether an audience participant is gesturing during a presentation by the speaker participant. For example, the gesturing can include rubbing their eyes as indication of boredom or tiredness, raising their hand for a question, or scratching their head in confusion. For example, the movement detection tool 504 can detect movement or gestures by identifying an object in the video data and tracking the object across multiple frames in the video data.

In some implementations, the movement detection tool 504 can detect, for example, whether an audience participant is making vernacularized gesturing during a presentation by the speaker participant. In this example, the vernacularized gestures are gestures which can have regional or region-based meanings. For example, the movement detection tool 504 may, using one or more learning models trained for gesture recognition on a regional basis, understand that a person located in one region who is nodding their head may be communicating the same reaction as a person located in another region who is wobbling their head. The movement detection tool 504 can detect movement or gestures by identifying an object in the video data and tracking the object across multiple frames in the video data.

The keyword reaction detection tool 506 detects keyword reactions of an audience participant to a temporally associated portion of a presentation by the speaker participant based on a real-time transcription of the conference. The keyword reaction detection tool 506 may obtain and use the real-time transcription of the conference, which may be generated by the reaction recognition software 500, the audience engagement software, the conferencing software, or other software, to detect the keywords which are associated with reactions. For example, timestamps from the real-time transcript can be compared against timestamps from the conference to determine the audience video data which aligns with the presentation portions spoken by the speaker. Alternatively, the keyword reaction detection tool 506 may use output of a learning model trained for keyword reaction processing to detect keywords. For example, the learning model may evaluate content of the real-time transcription to produce the output. For example, keyword reactions can include, but is not limited to, yes, no, got it, huh, okay, and question.

The sound reaction detection tool 508 determines from audible files of an audience participant a reaction to a temporally associated portion of a presentation by the speaker participant. The sound reaction detection tool 508 can detect and identify sounds such as, but not limited to, gasps, exclamations, and yawning from the audience participant. The sound reaction detection tool 508 may use the output of a learning model trained for sounds to identify a reaction. For example, the identified reactions can include, but is not limited to, surprise and bored.

Although the tools 502 through 508 are shown as functionality of the reaction recognition software 500 as a single piece of software, in some implementations, some or all of the tools 502 through 508 may exist outside of the reaction recognition software 500 and/or the software platform may exclude the reaction recognition software 500 while still including the some or all of tools 502 through 508 in some form elsewhere.

Figure 6:
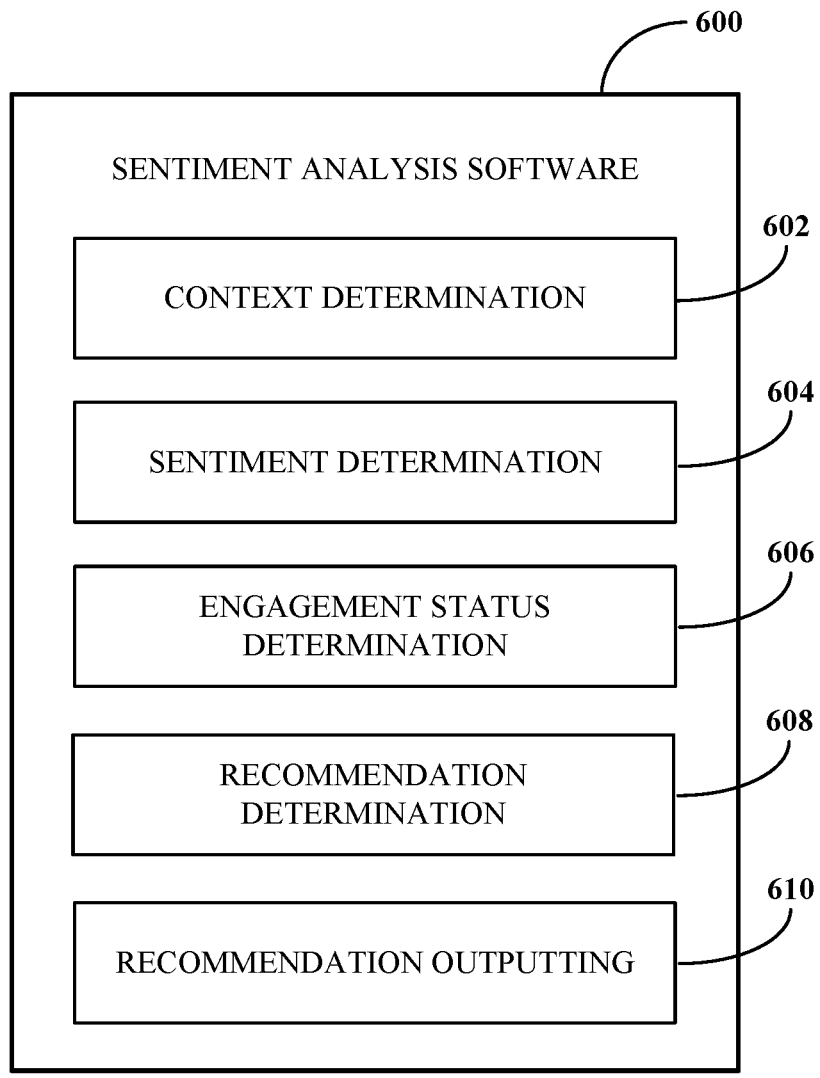
FIG. 6 is a block diagram of example functionality of sentiment analysis software.

FIG. 6 is a block diagram of example functionality of sentiment analysis software 600. The sentiment analysis software 600 includes tools, such as programs, subprograms, functions, routines, subroutines, operations, and/or the like for determining a sentiment type for a detected reaction, determining an engagement level based on the sentiment types, and presenting a real-time recommendation output to the speaker participant based on the engagement level. As shown, the sentiment analysis software 600 includes a context determination tool 602, a sentiment determination tool 604, an engagement status determination tool 606, a recommendation determination tool 608, and a recommendation outputting tool 610.

The context determination tool 602 determines a context of the conference at or near the time of the reaction detection by evaluating content of a real-time transcription of the conference using a contextual machine learning model. In some implementations, the context determination tool 602 determines a context associated with the speaker participant at a time of the reaction detection based on a real-time transcription of the conference or portions of the conference associated with the speaker presentation. In some examples, the context determined by the context determination tool 602 can indicate that the conference is a sales conference, a classroom presentation, or a seminar. The context determination tool 602 may obtain and use the real-time transcription of the conference, which may be generated by the sentiment analysis software 600, the audience engagement software, the conferencing software, or other software, to determine the context. For example, the words from the real-time transcription of the conference are input to a contextual machine learning model. The contextual machine learning model can identify the context, i.e., a setting or environment suggested by the words. Alternatively, the context determination tool 602 may use output of a learning model trained for contextual content processing to determine the context. For example, the learning model, which may be a contextual machine learning model, may evaluate content of the real-time transcription to produce output. The output may, for example, be a context of the conference.

The sentiment determination tool 604 determines a sentiment type for a detected reaction using the determined context. A sentiment type for a detected reaction refers to, but is not limited to, a positive reaction, negative reaction, questioning reaction, surprised reaction, neutral, or blank face reaction. The context determination tool 602 may use output of a learning model trained for sentiment processing to determine the sentiment type. For example, the learning model, which may be a contextual machine learning model, may evaluate the detected reaction in view of the determined context to produce output. The output may, for example, be a sentiment type for the detected reaction. The sentiment determination tool 604 maintains a count of outputted sentiment types. For example, sentiment types can be data maintained as bins in a histogram.

The engagement status determination tool 606 determines an engagement level or type based on the aggregated sentiment types. In an example, the engagement level can be determined from a most frequent bin in the histogram. In another example, sentiment types can be assigned a numerical value such as 10 for smiling and 0 for bored. The assigned values can change depending on the determined context. The engagement level can then be determined by averaging the numbers. A high value can be highly engaged and a low value can be not engaged. Alternatively, the engagement status determination tool 606 may use output of a learning model trained for contextual content processing to determine the engagement level. For example, the learning model, which may be a contextual machine learning model, may evaluate the sentiment types and a quantitative value for each sentiment type to produce output. The output may, for example, be the engagement level.

The recommendation determination tool 608 determines a real-time recommendation output based on the engagement level. The recommendation determination tool 608 can provide, for example, maintain, change, or pause real-time recommendations based on the engagement level. In an example, a change type recommendation output can include a recommended topic. For example, the recommendation determination tool 608 can evaluate content of a real-time transcription of the conference using a contextual machine learning model to identify change recommendation topics. In another example, a change type recommendation output can include a recommended speaker presentation behavior. For example, when a current behavior is determined to be monotonic, the recommendation determination tool 608 can recommend change voice modulations to the speaker. In another example, when the speaker is mumbling, the recommendation determination tool 608 can recommend to the speaker to speak more clearly and/or loudly. The recommendation determination tool 608 can provide, for example, a combination of the topic and presentation behavior recommendations based on the engagement level.

The recommendation outputting tool 610 causes a presentation of the real-time recommended output to the speaker participant in accordance with the determination by the recommendation determination tool 608. Generally, the recommendation outputting tool 610 outputs instructions, commands, or other information configured to cause the device of the speaker participant to output the recommended output to the speaker participant. For example, the real-time recommendation output can be provided as a prompt to the speaker, a green-yellow-red or color-based graphic, a number from 1 to 10, text, and/or combinations thereof. In some cases, the recommendation outputting tool 610 outputs those instructions, commands, or other information to a secondary device associated with the speaker participant. For example, if conferencing software running at the device associated with the speaker is outputting user tiles of conference participants in a gallery view arrangement, then the presentation of the real-time recommendation output can be on a secondary device such as tablet or at a lectern device. Thus, in such a case, the gallery view arrangement output at the device may remain uninterrupted while the real-time recommendation output is presented at the secondary device. In some examples, the device associated with the speaker may be considered a primary device and the secondary device may be designated in a companion mode for use with the primary device.

Although the tools 602 through 610 are shown as functionality of the sentiment analysis software 600 as a single piece of software, in some implementations, some or all of the tools 602 through 610 may exist outside of the sentiment analysis software 600 and/or the software platform may exclude the sentiment analysis software 600 while still including the some or all of tools 602 through 610 in some form elsewhere.

Figure 7:
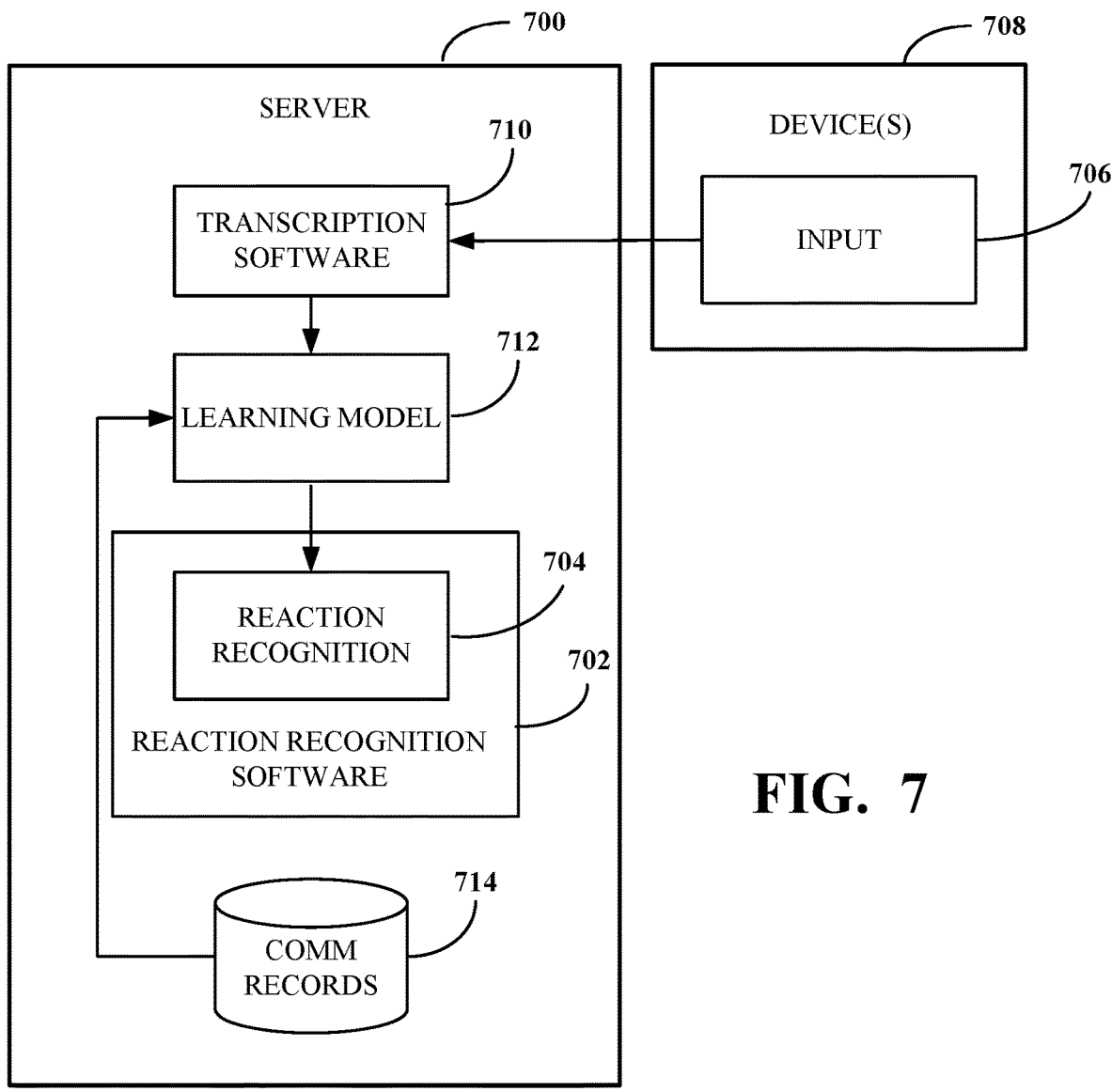
FIG. 7 is a block diagram of an example of a reaction detection based on input received from devices connected to conferencing software.

FIG. 7 is a block diagram of an example of reaction detection based on input received from devices connected to conferencing software. As shown, a server 700 runs reaction detection software 702 which includes a reaction recognition tool 704. For example, the reaction recognition tool 704 includes the facial recognition tool 502, the movement detection tool 504, the keyword reaction detection tool 506, and the sound reaction detection tool 508 of FIG. 5. The reaction recognition tool 704 detects reactions of conference participants during a conference based on input 706 received from one or more devices 708 connected to the conference. For example, the server 700, the reaction detection software 702, and the one or more devices 708 may respectively be the server 402, part of or integrated with audience engagement software 406, and the one or more audience devices 416 shown in FIG. 4.

In particular, the one or more devices 708 include or otherwise refer to devices such as audience participant devices (e.g., the audience devices 416 shown in FIG. 4). As such, the input 706 received from the one or more devices 608 is received from all devices in the conference. For example, the input 706 is audio information captured over one or more audio channels between the devices 708 and conferencing software which implements the conference (e.g., the conferencing software 404 shown in FIG. 4) and video information captured over one or more video channels between the devices 708 and conferencing software which implements the conference.

The audio information of the input 706 is processed using transcription software 710 to generate a real-time transcription of the conference. In particular, the real-time transcription is generated in real-time concurrently with the conference based on real-time presentations, conversations, and the like occurring within the conference. Thus, the real-time transcription may not be considered fully generated until after a final presentation, conversation, or the like during the conference has ended. Accordingly, generating the real-time transcription includes or refers to generating a portion of the real-time transcription corresponding to a current conversation occurring at a given time during the conference. The transcription software 710 may, for example, be or refer to an automated speech recognition engine configured to access audio data of the conference, such as via the conferencing software.

The real-time transcription generated by the transcription software 710 is next processed using a learning model 712 to determine keywords and sound emanations associated with a participant of the conference. The learning model 712 may be or include a neural network (e.g., a convolutional neural network, recurrent neural network, or other neural network), decision tree, vector machine, Bayesian network, genetic algorithm, deep learning system separate from a neural network, or another machine learning model. The learning model 712 is trained to recognize content and context of conversations. For example, the learning model 712 may be a contextual learning model which is trained to evaluate the content of the real-time transcription generated by the transcription software 710, to identify keywords spoken and sounds emanated in reaction to a speaker presentation.

In particular, to identify keywords, the learning model 712 evaluates instances of words within the real-time transcription based on a context thereof to determine when such an instance is associated as a reaction of a participant. For example, a participant saying "understood" after an explanation by the speaker can be a keyword reaction detection. In another example, a participant saying "over my head" can after an explanation by the speaker can be a keyword reaction detection. The learning model 712 evaluates keywords and/or related content within the real-time transcription against historical communication records 714 to determine when such keywords and/or related content correspond to reaction detections.

Separately, to identify sound utterances, the learning model 712 evaluates instances of sounds utterances within the audio stream to determine when such an instance is associated as a reaction of a participant. For example, a participant uttering "huh" after an explanation by the speaker can be a sound reaction detection. In another example, a participant eliciting a "gasp" after an explanation by the speaker can be a sound reaction detection. The learning model 712 evaluates the sound utterances against historical communication records 714 to determine when such sound utterances correspond to reaction detections.

In some implementations, one or both of the transcription software 710 or the learning model 712 may be included in the reaction recognition software 702. In some implementations, the historical communication records 714 may be located other than on the server 700 on which the reaction recognition software 702 is partially or wholly run.

Figure 8:
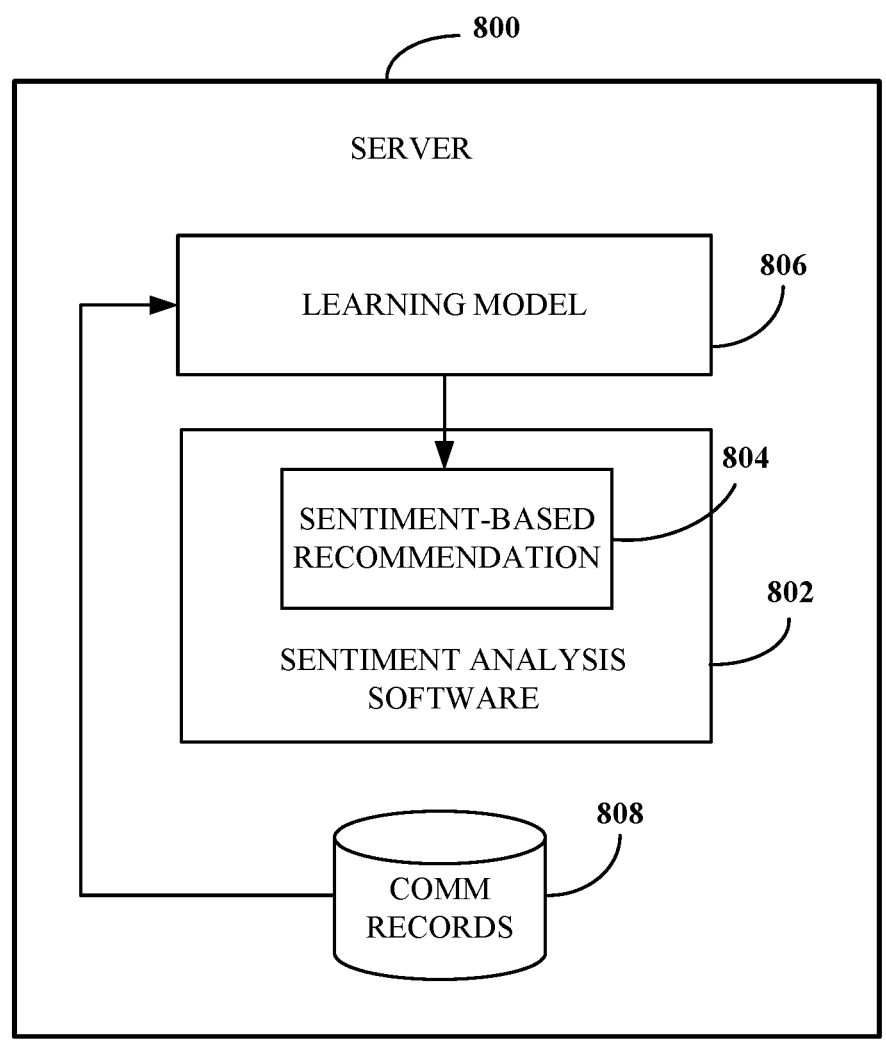
FIG. 8 is a block diagram of an example of a sentiment determination based on input received from reaction recognition software.

FIG. 8 is a block diagram of an example of a sentiment determination based on input received from reaction recognition software. As shown, a server 800 runs sentiment analysis software 802 which includes a sentiment-based recommendation tool 804. For example, the sentiment-based recommendation tool 804 includes one or more of the context determination tool 602, the sentiment determination tool 604, the engagement status determination tool 606, the recommendation determination tool 608, and the recommendation outputting tool 608 of FIG. 6. The sentiment-based recommendation tool 804 determines sentiment types, engagement levels, and real-time recommendations for a speaker from detected reactions of participants during a conference. For example, the server 800 and the sentiment analysis software 802 may respectively be the server 402 and part of or integrated with audience engagement software 406 shown in FIG. 4.

In particular, the sentiment-based recommendation tool 804 determines the context of the conference at or near the time of the detected reaction by evaluating content of a real-time transcription of the conference using a contextual machine learning model. The determined context and the recognized reactions from a reaction detection software such as reaction detection software 702 as shown in FIG. 7 are input processed using a learning model 806 to determine a sentiment type associated with the participant of the conference. The learning model 806 may be or include a neural network (e.g., a convolutional neural network, recurrent neural network, or other neural network), decision tree, vector machine, Bayesian network, genetic algorithm, deep learning system separate from a neural network, or another machine learning model. The learning model 806 is trained to recognize context and reaction patterns. For example, the learning model 806 may be a contextual learning model which is trained to evaluate the recognized reaction in view of the determined context. For example, if the recognized reaction is a frown after an explanation by the speaker, then the sentiment type can be one of confusion. In another example, if the recognized reaction is a "yay" after a sales presentation, then the sentiment type can be one of elation. The learning model 806 evaluates the context and reaction against historical communication records 808 to determine when and which context and reaction pairs correspond different sentiment types.

In some implementations, the learning model 806 may be included in the sentiment analysis software 802. In some implementations, the historical communication records 808 may be located other than on the server 800 on which the sentiment analysis software 802 is partially or wholly run.

Figure 9:
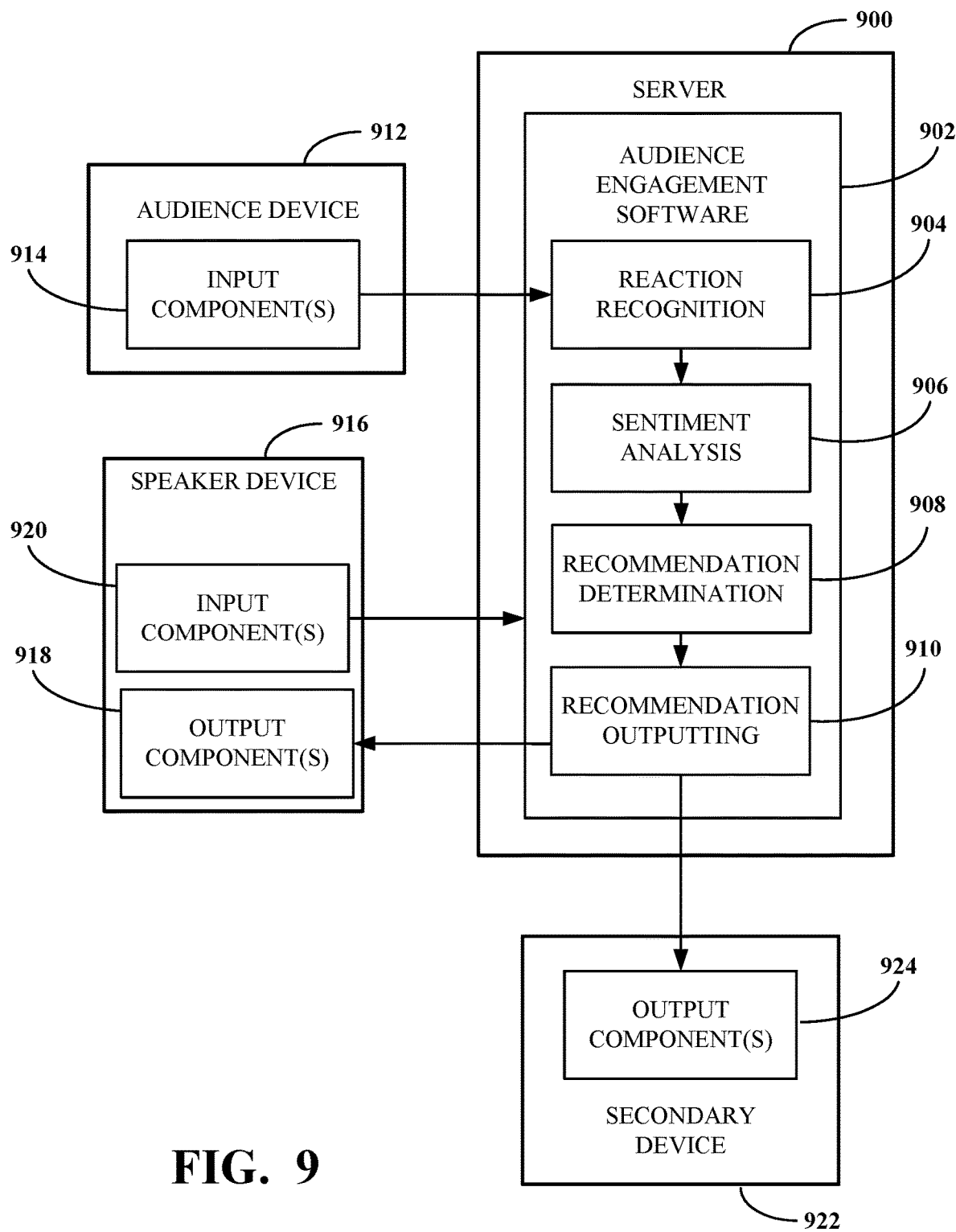
FIG. 9 is a block diagram of an example of outputting real-time recommendations using real-time video-based audience reaction sentiment analysis.

FIG. 9 is a block diagram of an example of recommendation outputting in connection with audience engagement analysis during a conference. As shown, a server 900 runs audience engagement software 902 which includes a reaction recognition tool 904, a sentiment analysis tool 906, a recommendation determination tool 908, and a recommendation outputting tool 910. The reaction recognition tool 904 detects and recognizes reactions from audience participants. The sentiment analysis tool 906 determines a context of a presentation during the conference, determines a sentiment type of a recognized reaction using the determined context, and determines an engagement level based on aggregated sentiments. The recommendation determination tool 908 determines a real-time recommendation output based on the engagement level which can include suggestions to maintain, change, or pause a current presentation by a speaker. The recommendation outputting tool 910 outputs the recommendation output. For example, the server 900 may be the server 402 shown in FIG. 4, include the server 700 shown in FIG. 7, and include the server 800 shown in FIG. 8, to the extent different. In another example, the audience engagement software 902 may be the audience engagement software 409 shown in FIG. 4, include the reaction recognition software 500 shown in FIG. 5, or include the sentiment analysis software 600 shown in FIG. 6, to the extent different. In yet another example, the reaction recognition tool 904, the sentiment analysis tool 906, the recommendation determination tool 908, and the recommendation outputting tool 910 may respectively be the reaction recognition tool 704 shown in FIG. 4, the sentiment determination tool 604 and the engagement status determination tool 606 shown in FIG. 6, the recommendation determination tool 608 shown in FIG. 6, and the recommendation outputting tool 610 shown in FIG. 6, to the extent different.

The reaction recognition tool 904 receives content from input components 914 of audience devices 912 during a conference. For example, the input components 914 may be image capturing devices, cameras, audio input devices, and video input devices. The reaction recognition tool 904 processes the content. The processing can include one or more of detecting and recognizing participant reactions to a speaker presentation during the conference.

The sentiment analysis tool 906 determines the context of the speaker presentation during the conference. The context is used by the sentiment analysis tool 906 to determine a sentiment type for recognized reactions. The determined sentiment types are aggregated from each of the audience devices 912. The sentiment analysis tool 906 analyzes the aggregated sentiment types to determine an engagement level or status representative of the collective audience devices 912.

The recommendation determination tool 908 determines the real-time recommendation output based on the engagement level. In an example, the recommendation determination tool 908 can also use a speaker presentation behavior as determined by the audience engagement software 902. The audience engagement software 902 can use input from input components 920 of a speaker device 916 to determine the speaker presentation behavior. The real-time recommendation output can be provided in one or more formats including, for example, a numeric value, a textual recommendation, and/or combinations thereof. In an example, the real-time recommendation output can include suggestive language including, for example, maintain a current presentation by a speaker, change topics, maintain speaker presentation behavior, change speaker presentation behavior, and/or pause presentation or conference for a question.

The recommendation outputting tool 910 then causes a presentation of output to the speaker participant according to the determinations made by the recommendation determination tool 908. In particular, the recommendation outputting tool 910 transmits instructions, commands, or other information configured to output the real-time recommendation output to one or more output components 918 on the speaker device 916. The output components 918 may, for example, include a display and/or an audio output device associated with the speaker device 916. In some implementations, the recommendation outputting tool 910 may transmit instructions, commands, or other information configured to output the real-time recommendation output to one or more output components 924 of a secondary device 922 associated with the speaker participant. For example, the secondary device 922 may be another device through which the speaker participant has accessed conferencing software used to implement the conference. In another example, the secondary device 922 may be another device registered to an account of the speaker participant. In yet another example, the secondary device 922 may be another device detected on a same network to which the speaker device 916 is connected. The output components 924 may, for example, include a display and/or an audio output device associated with the secondary device 922. The secondary device 922 may be a mobile device, such as a laptop, tablet, or mobile phone, or it may be a wearable device, such as a network-connected wristband, ring, or watch.

Figure 10:
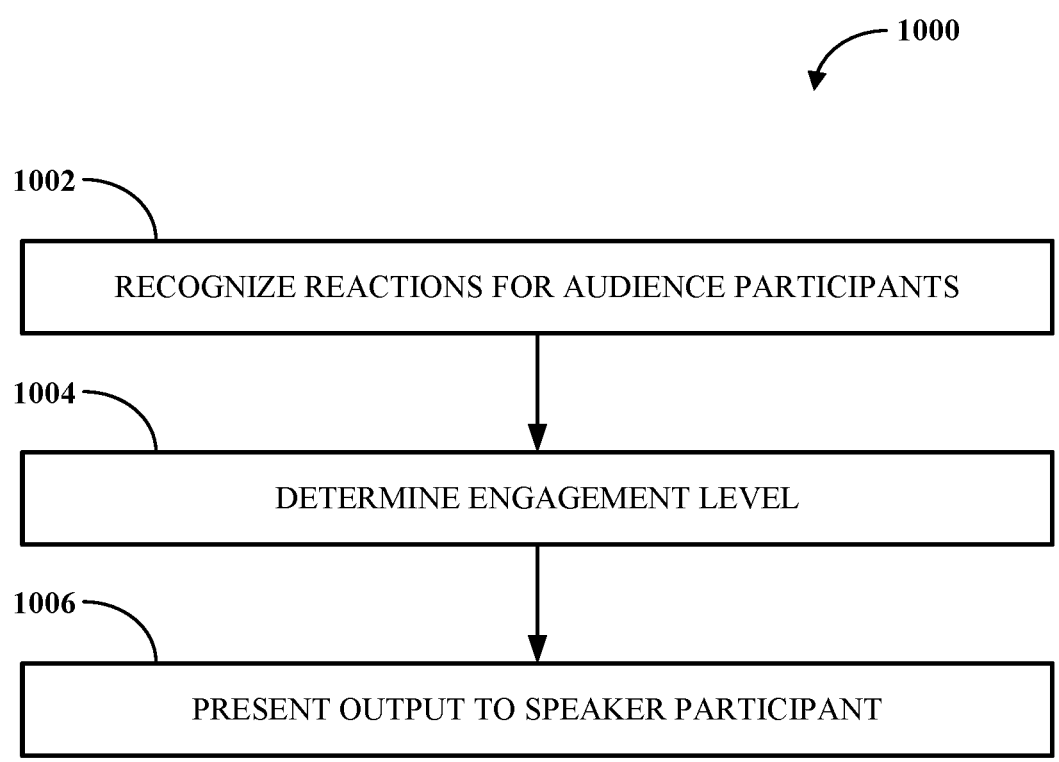
FIG. 10 is a flowchart of an example of a technique for providing speaker recommendations based on real-time video-based audience reaction sentiment analysis.

To further describe some implementations in greater detail, reference is next made to examples of techniques which may be performed by or using a system for real-time video-based audience reaction sentiment analysis. FIG. 10 is a flowchart of an example of a technique 1000 for a conference. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, content including audience participation reactions of audience participants to a speaker participant during a conference are obtained. The content also includes the speaker presentation associated with the audience participation reactions. The content may include audio and/or video. Both aspects of the content, the audience participation reactions and the associated speaker presentation can be timestamped so as to provide context to the audience participation reactions as described herein. The content is obtained from audience participants who are perceptible and are imperceptible with respect to a view arrangement used at a speaker participant device. Accordingly, real-time recommendation outputs, as described herein, can account for audience participation reactions which are missed by the speaker participant. The audience participation reactions are processed using reaction recognition software. A real-time transcription of the audio content is obtained. Obtaining the real-time transcription may include generating the real-time transcription. Alternatively, obtaining the real-time transcription may include obtaining the real-time transcription from a software aspect which generates it. The real-time transcription is generated in real-time with a conversation occurring within a conference call attended by multiple participants including a speaker participant. The transcribed content including the audience participation reactions are evaluated using a contextual machine learning model to recognize reactions. The audio content is also evaluated using an audio-based contextual machine learning model to recognize sound reactions. The video content is processed using facial recognition and movement detection techniques to recognize visual reactions. The sentiment types are determined for each recognized reaction. The sentiment type processing includes determining a context of the speaker presentation associated with the audience participation reaction. A contextual machine learning model can be used to determine the context. The recognized reactions are evaluated in view of the context using, for example, a contextual machine learning model to identify sentiment types.

At 1004, an engagement level is based on the sentiment types. The sentiment types for the audience participation reactions for the audience participants are aggregated, accumulated, counted, or tracked. For example, a histogram can be maintained to track quantity of sentiment types. In another example, each sentiment type is associated with a value in a range of values. For example, positive sentiment types can be assigned values at a higher end of the range of values and negative sentiment types can be assigned values at a lower end of the range of values. Counters can be maintained for each sentiment type, for example. The engagement level is determined from the aggregated sentiment types. An engagement level can be determined by numerically analyzing the aggregated sentiment types in a histogram, for example. For example, an engagement level is assigned based on a most frequently occurring sentiment type in the histogram. In another example, the sentiment type with the highest value is used to determine the engagement level. Other techniques can be used to determine engagement level. A real-time recommendation output is then determined based on the engagement level. In addition, the recommendation output processing can account for speaker participant presentation behavior as described herein. The real-time recommendation output can provide suggestions including, for example, maintain a present presentation topic and behavior due to a positive engagement level, change a present presentation topic due to a negative engagement level, change a present presentation behavior due to a negative engagement level, change a present presentation topic and a presentation behavior due to a negative engagement level, and/or pause a presentation due to a question. The real-time recommendation output can be presented in one or more formats including, for example, a numeric format and/or a text-based format.

At 1006, the real-time recommendation output is presented to provide feedback or reinforcement with respect to audience participant engagement during the conference call. Configuration information associated with a speaker device of the speaker participant is obtained. The configuration information associated with the speaker device may refer to audio output device settings, video output device settings, view selection, usage and/or environment settings. The configuration information is used to determine how the real-time recommendation output is presented and where the real-time recommendation output is presented as described herein. In some implementations, presenting the real-time recommendation output to the speaker participant may include causing a secondary device associated with the speaker participant to present the output. In some such implementations, the secondary device may be identified as part of the process for presenting the real-time recommendation output. The secondary device may be a mobile device or a wearable device.

Some implementations may include a method that includes determining, during a conference, sentiment types of audience participants reacting to a speaker participant based on reaction detections from video data of the audience participants. An engagement level can be determined based on the sentiment types. Real-time recommendation outputs can be presented by a client device associated with the speaker participant based on the engagement level. In one or more implementations, the sentiment types of the audience participants are determined by aggregating the sentiment types for the audience participants which are perceptible and imperceptible to the speaker participant. In one or more implementations, determining the sentiment types of the audience participants comprises determining a context associated with the speaker participant of the reaction detection based on a real-time transcription of the conference and determining the sentiment type based on the context. In one or more implementations, the method may include evaluating content of a real-time transcription of the conference using a contextual machine learning model to identify the real-time recommendation output. In one or more implementations, the method may include determining a performance characterization of the speaker participant corresponding to the reaction detection, wherein the real-time recommendation output indicates, when the engagement level is positive, to continue discussing a current topic and to continue a speaker participant behavior. In one or more implementations, the method may include determining a performance characterization of the speaker participant corresponding to the reaction detection, wherein the real-time recommendation output indicates, when the engagement level is negative, to change at least one of a topic or a speaker participant behavior. In one or more implementations, the method may include maintaining engagement levels over a course of the conference to determine trends and determining an impact of real-time recommendation outputs on the engagement levels over the course of the conference. In one or more implementations, the real-time recommendation output indicates, when the engagement level is positive, to continue discussing a current topic. In one or more implementations, the real-time recommendation output indicates, when the engagement level is negative, to change to a new topic determined by a contextual machine learning model. In one or more implementations, the real-time recommendation output indicates, when the engagement level is neutral, to pause the conference for questions.

Some implementations may include an apparatus that includes a memory and a processor configured to execute instructions stored in the memory to determine sentiment types of audience participants reacting to a speaker participant during a conference, the sentiment types based on reaction detections from video data of the audience participants, determine an engagement level based on the sentiment types, and present a real-time recommendation output by a client device associated with the speaker participant based on the engagement level. In one or more implementations, the processor is configured to execute the instructions to measure a number of occurrences of each sentiment type. In one or more implementations, the processor is configured to execute the instructions to determine the reaction detections based on facial recognition and movement detection on video data of the audience participants. In one or more implementations, the processor is configured to execute the instructions to determine the engagement level based on most frequently occurring sentiment type. In one or more implementations, the processor is configured to execute the instructions to use output of a contextual machine learning model that evaluates content of real-time transcription of the conference to determine a context for the reaction detections.

Some implementations may include a non-transitory computer readable medium storing instructions operable to cause one or more processors to perform operations comprising determining, during a conference, sentiment types of audience participants reacting to a speaker participant based on reaction detections from video data of the audience participants, determining an engagement level based on the sentiment types, and presenting a real-time recommendation output by a client device associated with the speaker participant based on the engagement level. In one or more implementations, the processor is configured to execute the instructions to generate a histogram with bins for different sentiment types and determine the engagement level based on most populated bin in the histogram. In one or more implementations, the processor is configured to execute the instructions to assign a numeric value from a range of values to each sentiment type and determine the engagement level based on sentiment type with highest total value. In one or more implementations, the processor is configured to execute the instructions to evaluate content of real-time transcription of the conference to determine keywords as the reaction detections. In one or more implementations, the processor is configured to execute the instructions to detect the reaction detections from sound utterances present in an audio content.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    generating, by a transcription engine configured for automatic speech recognition, a real-time transcription of audio data from one or more participants temporally related to video data, wherein participants include a speaker participant and one or more audience participants;
    determining, by a processing of the video data using a machine learning system, meanings of reactions of the one or more audience participants to the speaker participant during a video conference based on the real-time transcription of the video conference and the reactions,
        wherein the video data visually represents the reactions,
        wherein determining the meanings of the reactions based on the real-time transcription of the video conference and the reactions includes determining a context associated with the speaker participant based on the real-time transcription of the video conference, and
        wherein the context associated with the speaker participant relates to a purpose of the conference;
    determining, by a server during the video conference, sentiment types of the one or more audience participants based on the determined meanings of the reactions, and maintaining a count of the determined sentiment types aggregated as bins in a histogram;
    determining, by the server during the video conference, an engagement level based on the most frequent bin in the histogram;
    causing, by the server, an outputting of a real-time recommendation based on the engagement level at a device associated with the speaker participant during the video conference; and
    providing, by the server using the machine learning system, a real-time recommendation to the speaker participant based on real-time recommendations that were previously effective, which are determined based on an aggregation of engagement levels, real-time recommendations, and speaker participant behaviors over multiple conferences.

2. The method of claim 1, wherein the sentiment types of the audience participants are determined by:
    aggregating, by the server, the sentiment types for the audience participants which are perceptible and imperceptible to the speaker participant, wherein the engagement level is based on a most counted sentiment type.

3. The method of claim 1, wherein determining the sentiment types of the one or more audience participants comprises:
    determining, by a machine learning system, contexts of the reactions, wherein a respective context is used to determine a meaning for a respective reaction; and
    determining, by a machine learning system, a respective sentiment type based on the meaning of the reaction as associated with the speaker participant and the meanings of the reactions as associated with the audience participants.

4. The method of claim 1, further comprising:
    evaluating, by a machine learning system trained for recommendation output generation, content of a real-time transcription of the conference to identify the real-time recommendation output.

5. The method of claim 1, further comprising:
    determining performance characterizations of the speaker participant corresponding to the reactions over the course of the conference to determine which speaker participant behavior is effective when the engagement level is positive.

6. The method of claim 1, further comprising:
maintaining, by the server, engagement levels over a course of the conference to determine trends including an engagement level before the real-time recommendation output, an engagement level after the real-time recommendation, and associated timestamps; and
determining, by the server, an impact of real-time recommendation outputs on the engagement levels over the course of the conference.

7. The method of claim 1, wherein a context indicates at least one of a setting or environment of the conference and wherein a different meaning is applied to the reaction based on the context.

8. The method of claim 1, wherein a reaction can have a different meaning based on a location.

9. The method of claim 1, wherein a context indicates at least one of a setting or environment of the speaker participant and wherein a different meaning is applied to the reaction based on the context.

10. An apparatus, comprising:
a memory; and
a processor configured to execute instructions stored in the memory to:
generate a real-time transcription of audio data from one or more participants temporally related to video data, wherein participants include a speaker participant and one or more audience participants;
determining, by a processing of the video data using a machine learning system trained for reaction detection, meanings of reactions of the one or more audience participants to the speaker participant during a video conference based on the real-time transcription of the video conference and the reactions, wherein the video data visually represents the reactions;
wherein determining the meanings of the reactions of the reactions based on the real-time transcription of the video conference and the reactions includes determining a context associated with the speaker participant based on the real-time transcription of the video conference, and
wherein the context associated with the speaker participant relates to a content of the conference;
determine, by a server during the video conference, sentiment types of the one or more audience participants based on the determined meanings of the reactions, and maintain a count of the determined sentiment types aggregated as bins in a histogram;
determine, by the server during the video conference, an engagement level based on the most frequent bin in the histogram;
cause, by the server, an output of a real-time recommendation based on the engagement level at a device associated with the speaker participant during the video conference; and
provide, by the server using the machine learning system, a real-time recommendation to the speaker participant based on real-time recommendations that were previously effective, which are determined based on an aggregation of engagement levels, real-time recommendations, and speaker participant behaviors over multiple conferences.

11. The apparatus of claim 10, wherein the processor is configured to execute the instructions to:
measure a number of occurrences of each sentiment type, wherein a most occurring sentiment type is the engagement level.

12. The apparatus of claim 10, wherein the processor is configured to execute the instructions to:
determine, by a machine learning system trained for facial recognition and movement detection, the reactions based on facial recognition and movement detection on video data of the audience participants, and based on locations associated with the audience participants.

13. The apparatus of claim 10, wherein the processor is configured to execute the instructions to:
determine the engagement level based on most frequently occurring sentiment type.

14. The apparatus of claim 10, wherein the processor is configured to execute the instructions to:
use, by the server, output of the machine learning system that evaluates content of the real-time transcription of the conference to determine a respective context for the reactions, wherein a different meaning is applied to a respective reaction based on a different context.

15. A non-transitory computer readable medium storing instructions operable to cause one or more processors to perform operations comprising:
generating, by a transcription engine configured for automatic speech recognition, a real-time transcription of audio data from one or more participants temporally related to video data, wherein participants include a speaker participant and one or more audience participants;
determining, by a processing of the video data using a machine learning system trained for reaction detection, meanings of reactions of the one or more audience participants to the speaker participant during a video conference,
wherein the video data visually represents the reactions;
wherein determining the meanings of the reactions based on the real-time transcription of the video conference and the reactions includes determining a context associated with the speaker participant based on the real-time transcription of the video conference, and
wherein the context associated with the speaker participant relates to a content of the conference;
determining, by a server during the video conference, sentiment types of the one or more audience participants based on the determined meanings of the reactions, and maintaining a count of the determined sentiment types aggregated as bins in a histogram;
determining, by the server during the video conference, an engagement level based on the most frequent bin in the histogram;
causing, by the server, an outputting of a real-time recommendation based on the engagement level at a device associated with the speaker participant during the video conference; and
providing, by the server using the machine learning system, a real-time recommendation to the speaker participant based on real-time recommendations that were previously effective, which are determined based on an aggregation of engagement levels, real-time recommendations, and speaker participant behaviors over multiple conferences.

16. The non-transitory computer readable medium of claim 15, wherein the processor is configured to execute the instructions to:
generate a histogram with bins for different sentiment types; and determine the engagement level based on most populated bin in the histogram.

17. The non-transitory computer readable medium of claim 15, wherein the processor is configured to execute the instructions to:
   assign a numeric value from a range of values to each sentiment type; and
   determine the engagement level based on sentiment type with highest total value.

18. The non-transitory computer readable medium of claim 15, wherein the processor is configured to execute the instructions to:
   evaluate content of the real-time transcription of the conference to determine keywords as the reactions and to determine contexts, wherein a different meaning is applied to the reaction based on the contexts.

19. The non-transitory computer readable medium of claim 15, wherein the processor is configured to execute the instructions to:
   detect the reaction and contexts from sound utterances present in an audio content.

* * * * *